Dec. 5, 1933.   I. WEDIN   1,937,928

PRESSURE GAUGE

Filed Aug. 25, 1928

Inventor
Ivar Wedin

By Blackmore, Spencer & Flint
Attorneys

Patented Dec. 5, 1933

1,937,928

UNITED STATES PATENT OFFICE 1,937,928

PRESSURE GAUGE

Ivar Wedin, Flint, Mich., assignor to A C Spark Plug Company, Flint, Mich., a company of Michigan Application August 25, 1928. Serial No. 302,051

19 Claims. (Cl. 73—109)

This invention relates to improvements in Bourdon tube gauges, particularly of the reversible gearless type.

In prior gauges of this kind, the socket for supporting the Bourdon tube has usually been placed at one edge of the casing due to the fact that Bourdon tubes were substantially circular in form. In the present invention the socket is positioned at the center of the back of the casing and a Bourdon tube of spiral form is used.

Prior gauges have also made use of a mounting plate for supporting posts or pillars of a frame and the gauge mechanism has been mounted on this frame. The structure of the present invention eliminates both pillars and mounting plate.

The socket of the present invention extends within the casing and is provided with a shoulder between the tube and the back of the casing, and to this shoulder an integral frame for mounting the pointer swinging mechanism is secured. The usual dial is also secured to the frame.

The pointer swinging mechanism and the pointer of the present invention are constructed integral of a single piece of metal. The pointer swinging mechanism has also formed integral therewith, a slotted plate which serves as a calibrating means for the gauge and also as an attaching means for the link which connects the Bourdon tube to the swinging mechanism. By varying the distance to which the hooked end of the connecting link extends into the slot, the gauge may be calibrated and accordingly as the hooked end extends to one side or the other of the axis of the movement of the pointer swinging mechanism, the pointer will be caused to swing either clockwise or counterclockwise in response to the same movement of the Bourdon tube. The connecting link is also provided with a U-shaped portion permitting adjustment of the link and a calibration of the gauge.

The portion of the socket extending within the casing is provided with a semi-cylindrical recess in which a Bourdon tube is positioned and secured by soldering.

Referring to the drawing.

Figure 1:
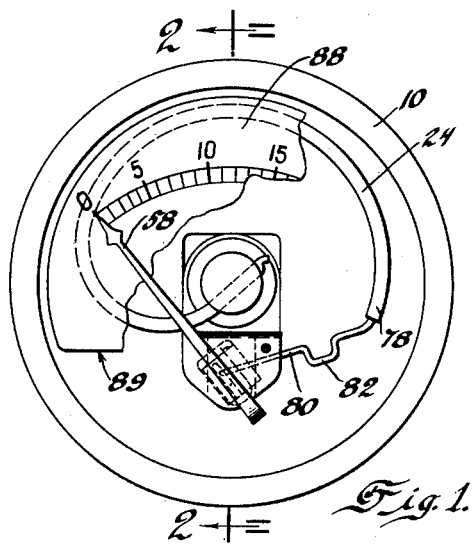
Fig. 1 shows a face view of the gauge with portions of the dial broken away to illustrate the mechanism.

Referring to the drawing, the numeral 10 indicates the gauge casing in the back portion 12 of which there is formed the squared portion 14 in which there is seated the squared portion 16 of a socket 18 having an external threaded portion 20 and an internal portion 22 and receiving the Bourdon tube 24. The casing 10 and its squared portion 14 are held on the socket by means of a nut 26 screwed on the threaded portion 20.

The internal portion 22 of the socket 18 is provided with a semicylindrical recess or cut-out portion 28 in which there is received the end 30 of the Bourdon tube 24. The end 30 is secured in the recess 28 by means of soldering as shown at 32. The socket 18 is suitably bored and communicates with the interior of the Bourdon tube 24.

The inner portion 22 of socket 18 is reduced and a shoulder is formed at 34. On the shoulder 34 the integral frame 36 is mounted by means of the leg 38. The leg 38 is provided with a suitable opening 40, as shown in Fig. 3, and in this opening the end of the socket is received. The frame is rigidly held on the socket by riveting over the shoulder edge as shown in Fig. 2.

Figure 2:
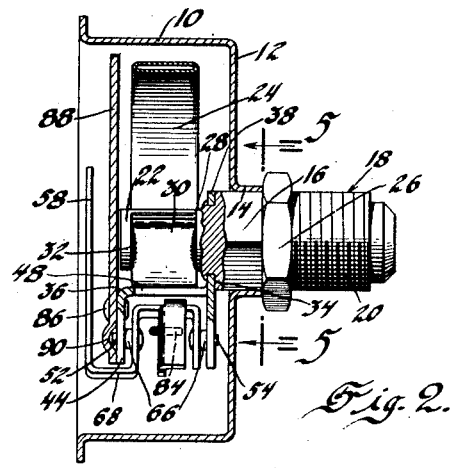
Fig. 2 is a section taken substantially on the line 2—2 of Fig. 1.
Figures 3, 4:
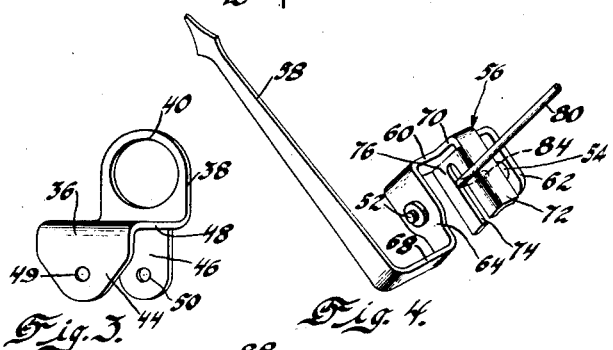
Fig. 3 is a perspective view of the frame for mounting the pointer swinging mechanism.
Fig. 4 is a perspective view of the integral pointer and pointer swinging mechanism showing the calibrating slot.
Figure 5:
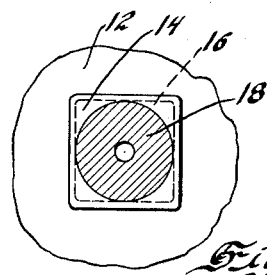
Fig. 5 is a section on the line 5—5 of Fig. 2.

The supporting portion of the frame 36 is U-shaped as is shown in Figs. 2 and 3, the U-shaped portion comprising the legs 44 and 46, the latter of which is formed by pressing out a portion of the back or base 48 of the U as is best shown in Fig. 2. Both legs 44 and 46 are formed with openings 49 and 50 for the reception of pivot studs 52 and 54 of the pointer swinging mechanism.

The pointer swinging mechanism is indicated as a whole at 56 and is formed of a single piece of metal as is shown in Fig. 4. The pointer swinging mechanism 56 has also formed integral therewith, the index or pointer 58. After being suitably stamped from a single sheet of metal the pointer and pointer swinging mechanism are bent as shown in Fig. 4. In its final position the pointer swinging mechanism 56 comprises the U-shaped frame including the base 60 and the legs 62 and 64. In each leg 62 and 64 there are secured the rivets 52 and 54, the extremities of which enter the opening 49 and 50 of the legs 44 and 46 of the frame 36, and thus form the pivots on which the pointer swinging mechanism turns. Between the U-shaped portion of the pointer swinging mechanism and the U-shaped frame 36, collars or spacers 66 are placed over the rivets 52 and 54 to space the frame of the pointer swinging mechanism from the supporting frame 36.

The pointer 58 is joined onto the leg 64 of the pointer swinging mechanism by means of the connecting member 68 which is bent at right angles to the leg 64 and the pointer in turn bent at right angles to the member 68.

Secured at the base 60 of the pointer swinging mechanism by means of the connecting arm 70 is a calibrating arm or plate 72 provided with a calibrating slot 74. The calibrating slot extends at right angles to the base 60 and to the axis of the pivots 52 and 54. The slot 74 is contained in a right angle bent portion 76 of the calibrating plate 72.

Secured to the free end 78 of the Bourdon tube 24 is a connecting link 80 provided intermediate its length with the U-shaped adjusting portion 82 and at its end with a bent or hooked portion 84. The hooked portion 84 engages in the slot 74 of the plate 76 and by suitably positioning the hooked end 84 to one extremity or the other of the slot 74, the pointer 58 may be caused to swing either clockwise or counter-clockwise in response to the same movement of the Bourdon tube. The calibration of the gauge is also made possible by slightly adjusting the distance from the pivotal axis at which the hooked end 84 engages in the slot 74. The nearer the hook 84 is to the pivotal axis, the greater will be the swing of the pointer swinging mechanism for the same degree of movement of the Bourdon tube 24. By suitably pinching together or expanding the U portion 82, the length of the link 80 may be adjusted.

Secured to the leg 44 of the frame 36 by means of rivets 86 is a dial 88 over which the pointer 58 moves. The dial 88 is provided with a recessed portion 90 adapted to receive the end of the rivet 52.

In the species shown in Figs. 1 to 5 inclusive, it will be noted that the socket 18 is mounted centrally of the back of the casing 12 and that the Bourdon tube 24 is spiral in shape to adapt it to be connected with the centrally positioned socket. The recessed portion 28 in the end 22 of the socket permits of a ready insertion and securing of the Bourdon tube without interference by the remaining structure.

Figure 6:
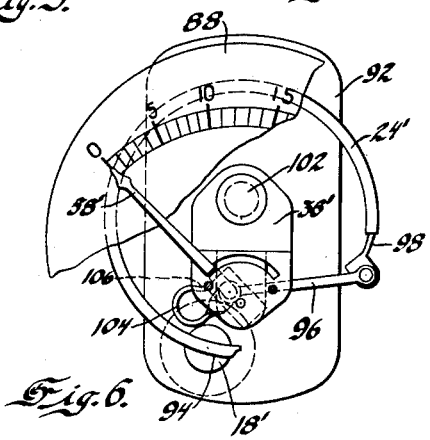
Figs. 6 and 7 are views corresponding to Figs. 1 and 2 of a modification.
Figure 7:
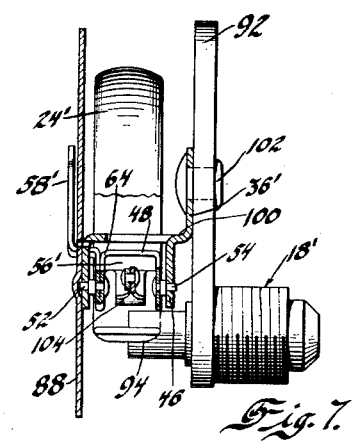

In the species shown in Figs. 6 and 7, the usual mounting plate 92 is used and in this mounting plate the socket 18' is mounted. The Bourdon tube 24' is mounted in a slot in the socket as shown at 94 and the free end connected to the pointer swinging mechanism 56' by means of a link 96 and a calibrating member 98.

The frame 36' is substantially the same as the frame 36 shown in Fig. 3, except that it has a slight angular portion shown at 100. The supporting frame 36' is secured to the mounting plate 92 by means of the rivet 102 and the pointer swinging mechanism 56' mounted on this plate in the manner similar to the mounting of the pointer swinging mechanism shown in Figs. 2 and 4.

By referring to Fig. 1, it will be noted that the dial 88 is segmental as shown by the chord at 89. The purpose of this construction is to allow the pointer to project over the dial without making an opening therein. This construction also permits of the use of a smaller dial and results in a saving of material.

The pointer swinging mechanism of the species shown in Figs. 6 and 7 differs from that shown in Figs. 2 and 4, in that the pointer 58' is bent to overlap the leg 64 of the frame and the pivot 52 passes both leg and pointer.

The slot 74 and hook 84 of the species of the Figs. 1 and 2 is replaced by the goose-neck 104 formed integral with the pointer swinging mechanism. The free end 106 of the goose-neck is attached to the free end of the link 96 to form the connection of the pointer swinging mechanism with the Bourdon tube 24'.

The purpose of the goose-neck 104 is to make a reversible gauge. By bending the goose-neck 104 around so as to cause the end 106 to swing through an arc of 180 degrees from the position shown in Fig. 6, it will cause a reverse swinging of the pointer 58'. With the connection shown in Fig. 6 the movement of the Bourdon tube will produce a clockwise movement of the pointer 58'. However, with the goose-neck 104 bent through 180 degrees, the same movement of the Bourdon tube will produce a counter-clockwise movement of the pointer 58', or cause it to swing from the extreme right hand end of the scale toward the left hand end.

The dial 88 is secured to the frame 36' by means of the rivets 86 similar to Figs. 1 and 2.

In the species of Figures 6 and 7, the novel pointer swinging mechanism and frame is applied to the conventional mounting of the socket with reference to the gauge.

If desired, instead of the plate and slot connection 72—74 of Fig. 4, the goose-neck construction 104 may be used.

I claim:

1. In a gauge, a casing, a socket secured centrally of the back of said casing, a shoulder on said socket within the casing, a frame rigidly supported on said shoulder, a Bourdon tube secured to said socket beyond said shoulder, and a pointer swinging mechanism mounted on said frame and connected to said tube.

2. In a gauge, a casing, a bored socket positioned centrally of the back of said casing, said socket having a lateral recess within the casing, a Bourdon tube secured within said recess, a pointer swinging mechanism operatively connected with said tube, a frame secured to the socket between the Bourdon tube and the casing and supporting said mechanism, and a dial secured to said frame.

3. In an integral pointer and pointer swinging mechanism for gauges, said mechanism comprising a U-shaped frame having pivot members, and means extending from the base of the U and parallel with the legs thereof to connect said frame to the pointer moving means of the gauge.

4. In a supporting frame for Bourdon tube gauges having a socket, comprising a leg having an opening through which the socket extends to mount the frame on the socket, spaced legs having openings adapted to mount a pointer swinging mechanism, one of said legs formed by a pressed out portion of the frame and leaving an opening in the frame.

5. In a gauge having a pointer and pointer swinging mechanism movably mounted in a frame, means interconnected with the pointer swinging mechanism to operate the same to move the pointer, the interconnection between the pointer swinging mechanism and the operating means being capable of adjustment to cause the mechanism to change the direction of movement of the pointer for the same movement of the operating means.

6. In a gauge having a pointer and pointer swinging mechanism movably mounted in a frame, pressure responsive means interconnected with the pointer swinging mechanism to operate the latter to move the pointer, the interconnection between said pointer swinging mechanism and said pressure responsive means being capable of adjustment to cause the pointer swinging mechanism to operate to change the direction of movement of the pointer for the same movement of the pressure responsive means.

7. In a gauge having a pointer and pointer swinging mechanism movably mounted in a frame, means interconnected with said swinging mechanism to operate the same to move the pointer, the interconnection between said means and mechanism including a slot in the swinging mechanism and a member engaged in said slot, said member being capable of adjustment in said slot from one side of the axis of movement of the pointer to the other side to cause said pointer swinging mechanism to change the direction of movement of said pointer in response to the same movement of the operating means.

8. In a gauge having a pointer and pointer swinging mechanism movably mounted in a frame, means interconnected with said pointer swinging mechanism to operate the same to move the pointer, the interconnection between said mechanism and said means comprising a hook and a member having a slot, said hook being capable of adjustment in said slot from one side of the axis of movement of the pointer to the other side to cause said pointer swinging mechanism to change the direction of movement of the pointer in response to the same movement of the operating means.

9. In a gauge having a pointer and pointer swinging mechanism movably mounted in a frame, means interconnected with said mechanism to operate the same to move the pointer, the interconnection between said mechanism and said means comprising a hook and a member having a slot, said hook being capable of adjustment in the slot across the axis of the movement of the pointer to cause said mechanism to change the direction of movement of the pointer in response to the same movement of the operating means.

10. In a gauge having a pointer, a socket, a casing mounted on said socket, a frame rigidly mounted on said socket within said casing, a Bourdon tube mounted on said socket, a pointer swinging mechanism movably mounted on said frame and connected to the pointer to swing said pointer in one direction, and means connecting the swinging mechanism to the Bourdon tube, said means and mechanism being relatively adjustable to provide for a swinging of the pointer in the opposite direction in response to the same movement of the Bourdon tube.

11. In a gauge, a bored socket, a casing secured to said socket, a semi-cylindrical recess in the side of said socket extending into said bore, a Bourdon tube having a portion mounted across said socket in said recess and communicating with said bore, and a frame for mounting the gauge mechanism, said frame mounted on said socket and positioned between said tube and casing.

12. In a gauge, a socket, a frame and a Bourdon tube mounted on said socket, a pointer swinging mechanism movably mounted on said frame, said mechanism including means for calibrating said gauge, a pointer integral with said mechanism, and means for connecting the mechanism to the Bourdon tube, said means including gauge calibrating means, said means and mechanism capable of being relatively adjusted to swing said pointer in any one of a plurality of directions for the same movement of the Bourdon tube.

13. In a gauge having a pointer and a casing, a socket extending into said casing, a Bourdon tube mounted on said socket in said casing, a frame supported on said socket in said casing, a pointer swinging mechanism movably mounted on said frame and connected to the pointer, means connecting the swinging mechanism to the Bourdon tube, said means and mechanism being capable of relative adjustment to provide for optional swinging of the pointer in either of two directions in response to the same movement of the Bourdon tube, said mechanism including a slot to accomplish the adjustment.

14. In a gauge having a pointer and a casing, a socket extending into said casing, a Bourdon tube mounted on said socket in said casing, a frame in said casing supported on said socket, a pointer swinging mechanism movably mounted on said frame and connected to the pointer, means connecting the pointer swinging mechanism to the Bourdon tube, said means and mechanism being capable of relative adjustment to provide for optional swinging of the pointer in either of two directions in response to the same movement of the Bourdon tube, said means including a hook portion engaging in said mechanism to accomplish the adjustment.

15. In a gauge having a pointer and a casing, a socket extending into said casing, a Bourdon tube mounted on said socket in said casing, a frame in said casing supported on said socket, a pointer swinging mechanism movably mounted on said frame and connected to the pointer, means connecting the swinging mechanism to the Bourdon tube, said means including means for calibrating the gauge, said mechanism and means being relatively adjustable to provide for optional swinging of the pointer in either of two directions in response to the same movement of the Bourdon tube.

16. In a gauge having a pointer and a casing, a socket extending into said casing, a Bourdon tube mounted on said socket in said casing, a one-piece frame in said casing rigidly mounted on said socket, a U-shaped portion on said frame, a pointer swinging mechanism movably mounted on said U-shaped portion and connected to the pointer, means connecting the pointer swinging mechanism to the Bourdon tube, said mechanism and means being relatively adjustable to provide for optional swinging of the pointer in either of two directions in response to the same movement of the Bourdon tube.

17. In a gauge having a pointer and a casing, a socket extending into said casing, a Bourdon tube mounted on said socket in said casing, a frame in said casing rigidly mounted on said socket, a dial secured to said frame, a pointer swinging mechanism movably mounted on said frame and connected to the pointer, means connecting the pointer swinging mechanism to the Bourdon tube, said mechanism and means being relatively adjustable to provide for optional swinging of the pointer in either of two directions in response to the same movement of the Bourdon tube.

18. In a gauge, a socket, a frame and a Bourdon tube mounted on said socket, a pointer swinging mechanism mounted on said frame, said swinging mechanism having a slot, a pointer integral with said mechanism and capable of being swung in one direction thereby, means for connecting the mechanism to the Bourdon tube, said means including gauge calibrating means, said slot permitting the relative adjustment of said connecting means and said mechanism for calibrating said gauge, said adjustment capable of causing said pointer to swing in the opposite direction in response to the same movement of the Bourdon tube.

19. In a gauge, a socket, a Bourdon tube mounted on said socket, a frame supported on said socket, a pointer swinging mechanism movably mounted on said frame, a pointer integral with said mechanism and swingable in one direction by the Bourdon tube, means including gauge calibrating means for connecting the mechanism to the Bourdon tube, said connecting means and mechanism including gauge calibrating means comprising a slot in said swinging mechanism and a bent end on said first-named means, said last-named calibrating means capable of adjustment to cause said pointer to swing in the opposite direction in response to the same movement of the Bourdon tube.

IVAR WEDIN.